United States Patent [19]

Wendler et al.

[11] Patent Number: 4,828,068

[45] Date of Patent: May 9, 1989

[54] HYDRAULICALLY POWER ASSISTED STEERING GEAR WITH PRESSURE RELIEF STOP

[75] Inventors: Paul O. Wendler, Saginaw; John F. Yonker, Frankenmuth, both of Mich.

[73] Assignee: General Motors Corporation, Detroit, Mich.

[21] Appl. No.: 838,892

[22] Filed: Mar. 11, 1986

Related U.S. Application Data

[63] Continuation of Ser. No. 576,311, Feb. 2, 1984, abandoned.

[51] Int. Cl.$^4$ .......................... B62D 5/06; F15B 15/22
[52] U.S. Cl. ............................... 180/148; 74/388 PS; 91/399; 91/400
[58] Field of Search .................. 180/148; 91/399, 400, 91/437; 74/388 PS

[56] References Cited

U.S. PATENT DOCUMENTS

| | | | |
|---|---|---|---|
| 2,172,240 | 9/1939 | Cornelius | 91/399 |
| 2,831,461 | 4/1958 | Kupka | 91/399 |
| 3,954,149 | 5/1976 | Strauff | 180/148 |

FOREIGN PATENT DOCUMENTS

| | | | |
|---|---|---|---|
| 2844146 | 5/1979 | Fed. Rep. of Germany | 180/148 |
| 3114380 | 11/1982 | Fed. Rep. of Germany | 91/400 |
| 0134203 | 8/1983 | Japan | 91/400 |

Primary Examiner—Samuel Scott
Assistant Examiner—Allen J. Flanigan
Attorney, Agent, or Firm—Charles R. White

[57] ABSTRACT

Rack and pinion steering gear with hydraulic power assist that is reduced as the vehicle wheels approach their positive wheel stops so that hydraulic loads on the steering gear and linkage are reduced and the power steering pump is not forced to excessive operation in relief.

6 Claims, 1 Drawing Sheet

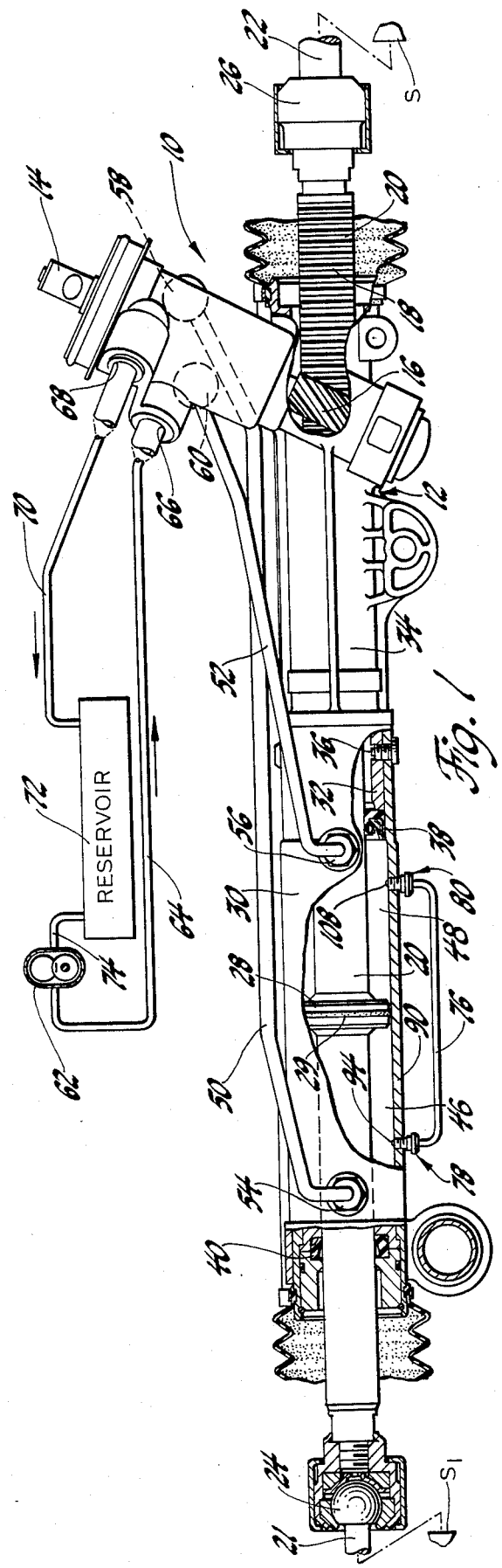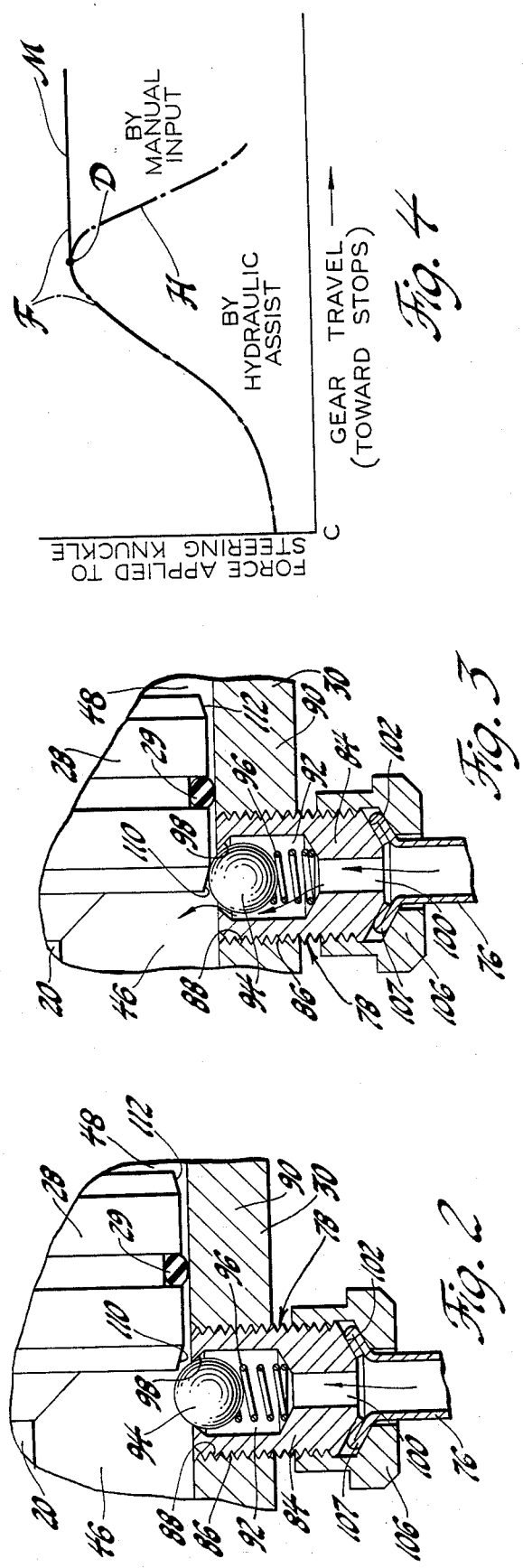

HYDRAULICALLY POWER ASSISTED STEERING GEAR WITH PRESSURE RELIEF STOP

This is a continuation of co-pending application Ser. No. 576,311, filed on Feb. 2, 1984, now abandoned.

This invention relates to vehicle steering gears and more particularly to a new and improved hydraulic power assisted steering gear featuring hydraulic relief of pressure chambers within a power cylinder of the gear subsequent to predetermined movement of a piston member mounted therein to limit loads on steering components and to enhance service like of the power steering pump.

Various integral power steering gears with sector gear output to a pitman arm utilize pressure relief devices within their rackpiston nut assemblies which open at the end of piston travel. These devices relieve hydraulic loads on the steering components and prevent undesirable pressure buildup in the pump supplying pressure fluid to the gear. A steering gear illustrative of the above is disclosed in the U.S. Pat. No. 3,935,796 to Goff which has a relief valve assembly disposed in an elongated bore in the rack piston nut assembly for such purposes. While the rack piston nut mounted relief constructions have been effective in relieving hydraulic loads on steering linkages and have extended pump service life, they are generally not suitable for rack and pinion application particularly where the piston is relatively thin and has a relatively long stroke within a slim tubular power cylinder extending from attachment with the rack and pinion housing.

This invention, in contrast to the prior art, provides for improved pressure relief in power assisted rack and pinion gears and is sufficiently versatile to be effectively utilized with other type gears including the aforementioned integral gear with sector gear output. The preferred embodiment of the present invention is incorporated directly on a power cylinder attached to the housing of a rack and pinion power steering gear. The rack of this gear extends into the cylinder and has a hydraulic piston fixed thereto which separates the cylinder into left and right turn pressure chambers which are selectively hydraulically connected to the rotary valve by separate lines to selectively charge and exhaust the chambers for hydraulic power assisted steering. Importantly, in this invention these chambers are hydraulically interconnected to one another by a passage external to the cylinders. The openings of this passage into the two chambers are controlled by radial ball check valves which can be displaced from sealing engagement with respect to their seats by mechanical engagement with the power assist piston or by high pressure in an associated pressure chamber. In this invention, when one chamber is charged with pressure and the opposing chamber is open to an exhaust through operation of the rotary valve, the piston will be displaced by the pressure differential for power assisted steering aiding the mechanical movement of the rack by the vehicle operator. As the piston is linearly moved for this power assisted steering, the steering knuckle will be turned to turn the dirigible wheel of the vehicle. As the steering knuckle approaches the associated wheel stop, the piston will trip a ball check valve to open the passage interconnecting the two cylinders so that the hydraulic pressure in the pressurized chamber is relieved and the pressure differential is diminished to zero. Under these conditions, the further input to the steering gear will be manual so that the load on the pump supplying the hydraulic power will be reduced to zero. With the reduced loading of the pump, pump service life is increased because the pump is operating against a lower pressure. Furthermore, with this reduced loading, there will be lower hydraulic stresses applied to the steering linkage. Rapid and excessive temperature buildup is also reduced due to flow being external from the pump.

Additionally, the present invention is adaptable for use with electric motor driven pumps since it reduces pump loading at pressure relief and current draw is accordingly reduced. This also prevents the rapid generation of heat in the motor and the electronic controls during pump relief conditions.

These and other features, objects and advantages of this invention will be more apparent from the following detailed description and drawing in which:

FIG. 1 is a front view of a portion of a rack and pinion steering gear with parts broken away and with a hydraulic schematic diagram added thereto.

FIG. 2 is an enlarged view of a portion of the power cylinder of the power assist rack and pinion steering gear of FIG. 1 illustrating operation of the invention.

FIG. 3 is a view similar to the view of FIG. 2 illustrating the mechanical displacement of the ball check valve of FIG. 2.

FIG. 4 is a graph illustrating operation of the invention.

Turning now in greater detail to the drawing, there is shown in FIG. 1 a hydraulic power assisted rack and pinion steering gear 10 having a main housing 12 in which a stub shaft 14 and an associated rotary power steering valve are operatively mounted. This stub shaft and valve can correspond to the stud shaft and valve disclosed in patent application Ser. No. 375,715 for Power Steering Gear and Open Center Rotary Valve Therefor, filed May 7, 1982 by Chris R. Spann and assigned to the assignee of this invention and hereby incorporated by reference. The teeth of a pinion gear 16 operatively connected to the stub shaft 14 meshes with the teeth 18 of an elongated rack 20 that is mounted for sliding movement through the main housing 12. Rotary movement of the pinion gear, initiated by the manual rotary steering inputs to the stub shaft, will produce lateral linear movement of the rack to steer the front wheel assemblies of the vehicle. These wheel assemblies have steering knuckles that are operatively connected by conventional tie rods 21, 22 to the ball joints 24, 26 mounted to opposite ends of the rack 20. Conventional wheel stops $S_1$, S are mechanically engaged by the steerable wheel assemblies, not shown, to limit the degree to which the wheel assemblies can be steered by the vehicle operator. The rack and pinion steering gear 10 features hydraulic power assist steering as controlled by the vehicle operator through the rotary power steering gear valve as explained in the above-referenced patent application Ser. No. 375,715 to Spann. To this end, a piston 28 carrying annular seal 29 is fixed to rack 20 and is mounted for sliding movement within an elongated power cylinder 30. The inboard end of this cylinder fits on a cylindrical shoulder 32 of a laterally projecting extension 34 of the main housing 12. The power cylinder is secured to housing 12 by fasteners 36. The rack 20 slidably extends through a stationary seal assembly 38 located within the power cylinder 30 at the end of shoulder 32 and through an outer bearing and seal assembly 40 closing the outer end of the power cylinder.

With the inboard and outboard seal assemblies in place, variable volume right and left turn fluid pressure chambers 46 and 48 are established on opposite sides of the piston. It will be appreciated that the teeth 18 of rack 20 do not extend to the seal assembly 38 in any condition of operation so that the sealing lip thereof slidably contacts only the cylindrical surface of rack 20. Fluid flow lines 50 and 52, hydraulically connected to respective chambers 46 and 48 by fittings 54 and 56 lead into ports 58 and 60 within housing 12 and into operative hydraulic connection with the rotary valve therein. The rotary valve is supplied with pressure fluid from a conventional hydraulic pump 62 through hydraulic line 64 that connects into a pressure port 66 formed in the housing 12. Fluid exhausted by the rotary valve 15 in housing 12 is fed through exhaust port 68 therein into line 70 that leads into a hydraulic fluid reservoir 72. This reservoir supplies fluid to the pump through line 74 as shown in FIG. 1.

Also as shown in FIG. 1, a third external tubular line 76 extends from connection with chamber 46 by a radial ball check valve assembly 78 into connection with chamber 48 by radial ball check valve assembly 80. The ball check valve assemblies 78 and 80 are the same and only assembly 78 is described in any detail.

As best shown in FIG. 2, the ball check valve assembly 78 is a capsule that comprises a cylindrical body 84 formed with external helical thread 86 connected into the threaded radial opening 88 formed through the cylindrical wall 90 of the power cylinder 30 leading into chamber 46. The ball check valve body 84 has a cylindrical pocket 92 therein which contains ball 94 and a light helical spring 96 seated in the pocket and urging the ball into fluid sealing engagement with a ball seat 98 formed in the end of body 84 which connects into the pressure chamber 46. A centralized passage 100 extends from the bottom of the pocket 94 through the conical end 102 of the ball check valve body 84. The external line 76 is of thin wall construction and has a flared end which seats on the conical end 102 of the body of the ball check valve. A nut 106, fitted over the tube prior to flaring at 107, is threaded onto the check valve body 84 to connect the line 76 to the chamber 46.

The radial ball check valve assembly 80 includes a ball 108 and is identical to ball check valve assembly 78. As shown, the balls 94 and 108 of these two check valve assemblies extend slightly above the inner surface of the cylinder and are adapted to be contacted by the piston 28 in response to predetermined linear stroking movement thereof to open the flow passage through the ball check valve leading into chamber 46 or 48 to provide the pressure relief stop of this invention as further explained below.

To control the amount of ball displacement and thereby the degree of opening and the flow through the ball seat of the ball check valve assemblies, the peripheral edges or corners of the piston 28 have annular chamfers 110 and 112 provided thereon. The chamfer angle can be reduced or increased from that shown to accordingly vary check ball displacement per unit of axial movement of the piston. By this means, the fluid flow rate between the chambers 48 and 46 can be controlled to thereby control the hydraulic action of this ball check valve arrangement in limiting power assisted rack travel.

In operation and assuming the vehicle operator has turned the stub shaft 14 and pinion gear 16 to effect power assist left turn, the rotary valve in housing 12 is turned so that left turn chamber 48 is fed with pressure fluid through line 52 while chamber 46 is open to exhaust via line 50, the rotary valve and the exhaust line 70. Under such conditions, the steering effort to the left is partly mechanical through the rack and pinion gear and partly hydraulic from hydraulic pressure force in chamber 48 exerted on piston 28 to move the rack 20 to the left. If the vehicle operator continues steering input, this power assist continues and the wheel assemblies are steered closer to their positive wheel stops. Before this position is reached, however, the linearly moving piston 28 approaches the ball check valve assembly 78 as shown in FIG. 2. Continued movement of piston 28 displaces the ball 94 from its seat as shown in FIG. 3. When this ball displacement occurs, pressure in chamber 48 unseats ball 108 and the line 76 between chambers 48 and 46 will be opened so that fluid will flow from chamber 48 into chamber 46. Since chamber 46 is open to exhaust line 70 via line 50 and the rotary valve, hydraulic power assist is reduced as tailored by chamber of the piston 28.

The curve of FIG. 4 illustrates this operation starting from an on-center position C. With the dumping of pressure fluid in chamber 48 as shown at point D on the steering force curve F, the hydraulic assist drops dramatically as shown by the tailing off of the hydraulic assist curve H. Further movement of the gear toward the positive wheel stops is increasingly mechanical and limited in magnitude as shown by the solid line flat segment M of the steering force F of FIG. 4.

Accordingly, with the relief of hydraulic forces in chamber 48, the load on the steering linkage and the gear will be mechanical and limited. With the load under direct control of the vehicle operator, the steering gear and linkage will be not be subjected to overloading to optimize service life. Also, with this invention, efficiency is increased since the pump 62 will not be in operation in relief or otherwise at the wheel stops and there is no excessive repumping of oil and therefore no overheating of the pump. This maximizes pump service life and the life of the power steering gear system.

Right turn operation is the same as that described in connection with left turn operation but with the piston 28 moving to the right so that the right turn inputs through the stub shaft will be power assisted. The chamber 46 is dumped in a manner similar to that described in connection with the dumping of chamber 48 but with the ball 104 being displaced by the chamfered edge 112 of piston 28. The operation is described in the graph shown in FIG. 4. In the event that a very solid "feel" is desired at the end of travel, a sharp edge can be provided on the piston in place of the chamfer to promote the most rapid radial displacement of the check ball per unit of axial movement of the piston. Furthermore, with the check ball and spring preassembled as a capsule, the height or penetration of the check ball into the cylinder can be varied. For short travel gears the capsule or housing would be threaded in as far as possible from a known reference position so that only a small amount of piston travel would be required to unseat the ball. For longer travel gears, the ball capsule would be retracted somewhat so that the piston would have to move further from the known reference position to unseat the ball. The light springs keep the check ball seated during non-demand conditions to avoid rattling and to provide good pressure response upon demand. This construction also avoids clicking or other ball contact noises that may otherwise occur with repeated quick hand wheel reversals when not at full travel. While the tubular flow path between the check balls has been shown in bent tube form, concentric tubes could provide hydraulic communication or a local saddle could be attached to the outside of the cylinder wall 90 in a sealing fashion. In any event, these radial systems are external and are readily accessible for repairs of adjustment if needed.

While a preferred embodiment of the invention has been shown and described to illustrate the invention, other embodiments will become apparent to those skilled in the art. Accordingly, the limits of this invention are defined in the following claims.

The embodiments of the invention in which an exclusive property or privilege is claimed are defined as follows:

1. A rack and pinion power assist steering gear for steering the dirigible wheels of a vehicle through a steering linkage comprising a steering gear housing, a pinion gear operatively mounted in said housing, a rack meshing with said pinion gear and operatively connected to said dirigible wheels, a hydraulic power unit for providing power assist steering, said power unit comprising a hydraulic cylinder and a piston operatively mounted therein drivingly connected to said rack, said piston having first and second contact faces on opposite ends thereof and having annular seal means between said faces to hydraulically separate first and second fluid chamber, a source of fluid pressure, power steering valve means operatively connected to said source of fluid pressure for hydraulically charging and exhausting said first and second chambers to effect axial movement of said piston and power assist steering, first and second displaceable valves disposed internally of said cylinder and respectively operatively mounted in said first and second chambers at a predetermined axial position with respect to one another and respectively contacted and displaced by said first and second contact faces, a fluid flow path external of said hydraulic cylinder operatively connected to said first and second valve for hydraulically interconnecting said first and second chambers only when said piston strokes to predetermined positions whereby one of said valves is contacted and displaced by one of said contact faces to open said fluid flow path to provide an exhaust passage back to said source through said chambers and said valve to eliminate the hydraulic assist of the steering and thereby to eliminate the hydraulic loads on the steering linkage.

2. The rack and pinion steering gear of claim 1 wherein said first and second valves comprise first and second ball dump valve means operatively mounted in said cylinder, each of said ball dump valve means having a ball adapted to be tripped and displaced by an associated contact face of said piston to open said fluid flow path when said piston approaches the end of its axial movement.

3. A rack and pinion power assist steering gear for steering the dirigible wheels of a vehicle through a steering linkage toward positive wheel stops comprising a steering gear housing, a pinion gear operatively mounted in said housing, a rack meshing with said pinion gear and operatively connected to said dirigible wheels, a hydraulic power unit for providing power assist steering, said power unit comprising a hdyraulic cylinder having one end thereof secured to said housing, and a piston operatively mounted therein having annular seal means between opposite end faces thereof to form first and second fluid chambers, said piston being drivingly connected to said rack, power steering valve means for hydraulically charging and exhausting said first and second chambers to effect axial travel of said piston and power assist steering, first and second displaceable valves respectively operatively mounted in said first and second fluid chambers for displacement by an end face of said piston associated therewith, and a fluid flow conduit external of said cylinder operatively connected to said first and second valves for hydraulically interconnecting said first and second chambers when said piston strokes to predetermined positions adjacent to the ends of said cylinder whereby one of said valves is displaced by an associated end face of said piston and the other of said valves is displaced by pressure fluid in an associated one of said chambers to provide an exhaust passage from one of said chambers to the other of said chambers and then to said valve means to thereby reduce the hydraulic assist of the steering and the hydraulic loads on the steering linkage.

4. The rack and pinion steering gear of claim 3 wherein said valves comprise ball check valve means radially mounted in the wall of said cylinder adjacent to opposite end portions thereof, said piston having outer diametrical edges which contact and displace the associated ball of said ball check valve means to open said fluid flow conduit when said piston approaches either end of its axial travel.

5. The rack and pinion steering gear of claim 4 wherein said edges are tapered for controlling the rate of displacement of said balls and the rate of fluid flow between said chambers.

6. The rack and pinion steering gear of claim 4 and further including mounting means adjustably mounting said ball check valve means between high and low radial limits within said associated chambers of said cylinder to thereby control the distance said piston travels to unseat said balls from their ball seats.

* * * * *